(12) United States Patent
Zhou et al.

(10) Patent No.: US 11,704,884 B2
(45) Date of Patent: Jul. 18, 2023

(54) METHOD, SYSTEM AND DEVICE FOR COMBINING MODELS IN VIRTUAL SCENE, AND MEDIUM

(71) Applicant: SHANGHAI LILITH TECHNOLOGY CORPORATION, Shanghai (CN)

(72) Inventors: Yan Zhou, Shanghai (CN); Di Wu, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 118 days.

(21) Appl. No.: 17/415,449

(22) PCT Filed: Sep. 25, 2019

(86) PCT No.: PCT/CN2019/107841
§ 371 (c)(1),
(2) Date: Jun. 17, 2021

(87) PCT Pub. No.: WO2020/143250
PCT Pub. Date: Jul. 16, 2020

(65) Prior Publication Data
US 2022/0020227 A1 Jan. 20, 2022

(30) Foreign Application Priority Data
Jan. 9, 2019 (CN) .......................... 201910019422.6

(51) Int. Cl.
*G06T 19/20* (2011.01)
*G06T 15/06* (2011.01)
*G06T 17/10* (2006.01)

(52) U.S. Cl.
CPC .............. *G06T 19/20* (2013.01); *G06T 15/06* (2013.01); *G06T 17/10* (2013.01);
(Continued)

(58) Field of Classification Search
CPC ......... G06T 19/20; G06T 15/06; G06T 15/10; G06T 17/00; G06T 17/10; G06T 2210/12;
(Continued)

(56) References Cited

U.S. PATENT DOCUMENTS

| 5,278,983 A | 1/1994 | Kawabe et al. |
| 2019/0147649 A1* | 5/2019 | Brochu .................. G06T 19/20 |
| | | 345/420 |

FOREIGN PATENT DOCUMENTS

| CN | 105989198 A | 10/2016 |
| CN | 106327590 A | 1/2017 |
| CN | 109754462 A | 5/2019 |

OTHER PUBLICATIONS

NPL Video Titled "How To Use The Structure Blocks In Minecraft 1.10", Published in 2016, available for viewing at: https://www.youtube.com/watch?v=3KqKpnuH00A (Year: 2016).*
(Continued)

*Primary Examiner* — Daniel F Hajnik
(74) *Attorney, Agent, or Firm* — Amster Rothstien & Ebenstein LLP

(57) ABSTRACT

The present invention relates to the technical field of two-dimensional (2D)/three-dimensional (3D) modeling, and in particular to a method, system, and device for combining models in a virtual scene, and a medium. The method of the present invention includes: placing a first model into a second model; determining a filling space and a removing space of the first model; filling an overlapping space between the first model and the second model with the second model, and filling the filling space of the first model with the second model; and removing the second model with which the removing space of the first model is filled, wherein when the overlapping space between the first model and the second model is filled with the second model, and the filling space of the first model is filled with the second
(Continued)

model, the removing space of the first model is filled with the second model. The present invention simplifies a workflow of a scene designer, reduces repetitive work, and achieves a desired effect of the models.

9 Claims, 5 Drawing Sheets

(52) U.S. Cl.
CPC ...... *G06T 2210/12* (2013.01); *G06T 2210/21* (2013.01); *G06T 2219/2004* (2013.01); *G06T 2219/2021* (2013.01)

(58) Field of Classification Search
CPC ......... G06T 2210/21; G06T 2219/2004; G06T 2219/2021
See application file for complete search history.

(56) References Cited

OTHER PUBLICATIONS

PCT International Search Report and Written Opinion dated Jan. 8, 2020 (Chinese and English).

\* cited by examiner

METHOD, SYSTEM AND DEVICE FOR COMBINING MODELS IN VIRTUAL SCENE, AND MEDIUM

CROSS REFERENCE TO RELATED APPLICATION

This application claims benefit under 35 U.S.C. § 371 to international application No. PCT/CN2019/107841 filed on Sep. 25, 2019, which claims priority to Chinese application No. 201910019422.6 filed Jan. 9, 2019, the contents of which are incorporated by reference in their entireties.

TECHNICAL FIELD

The present invention relates to the technical field of two-dimensional (2D)/three-dimensional (3D) modeling, and in particular to a method, system, and device for combining models in a virtual scene, and a medium.

BACKGROUND

In a process of designing 2D/3D virtual scenes, a scene designer often needs to combine one model into another model, such as combining a bullet into a wall, combining a workstation into a water body, combining a building into a natural terrain, etc.

The models are made by a model maker. In a process of making the models, the model maker usually predefines the models to achieve a desired effect. For example, when a bullet is combined into a wall, the bullet is embedded in the wall and wall fragments are splashed, when a workstation is combined into a water body, the underwater part of the workstation is buried in the water body, and when a building is combined into a natural terrain, the basement part of the building is buried in the natural terrain.

However, when combining models, especially when combining a large number of different models, because the scene designer often does not know pre-definitions of the models, the scene designer needs to ask one or more model makers, which leads to a cumbersome workflow. If the model maker cannot be found, the models can only be edited by the scene designer, which leads to repetitive work, and consequently a desired effect of the models cannot be achieved.

SUMMARY

An objective of the present invention is to provide a method, system, and device for combining models in a virtual scene, and a medium, to simplify a workflow of a scene designer, reduce repetitive work, and achieve a desired effect of the models.

The present invention discloses a method for combining models in a virtual scene, and the method includes:

placing a first model into a second model;

determining a filling space and a removing space of the first model;

filling an overlapping space between the first model and the second model with the second model, and filling the filling space of the first model with the second model; and removing the second model with which the removing space of the first model is filled, where when the overlapping space between the first model and the second model is filled with the second model, and the filling space of the first model is filled with the second model, the removing space of the first model is filled with the second model.

Optionally, the filling space of the first model is determined by receiving a user instruction.

Optionally, the first model includes a reference surface, and the first model is located on one side or both sides of the reference surface; after the first model is placed into the second model, rays are respectively made from one or more points on the reference surface to the second model along a placement direction, and one or more of the rays intersect a surface of the second model at one or more intersection points; and a first surface is determined by the one or more points on the reference surface, a second surface is determined by one or more intersection points where the one or more of the rays intersect the surface of the second model, and the filling space of the first model is determined by the first surface, the second surface, and the one or more of the rays.

Optionally, the one or more points on the reference surface include one or more points on a contour line of the reference surface.

Optionally, the removing space of the first model is determined by receiving a user instruction.

Optionally, the first model includes a reference surface, and the first model is located on one or both sides of the reference surface; and vertical line segments are respectively made from one or more points on the first model to the reference surface, and the removing space of the first model is determined by one or more of the vertical line segments and the reference surface.

Optionally, when the first model is located on one side of the reference surface, the one or more points on the first model include one or more points on the first model that are farthest from the reference surface; and when the first model is located on both sides of the reference surface, the one or more points on the first model include one or more points on the first model located on both sides of the reference surface that are farthest from the reference surface.

The present invention discloses a system for combining models in a virtual scene, and the system includes:

a placing module, configured to place a first model into a second model;

a determining module, configured to determine a filling space and a removing space of the first model;

a filling module, configured to fill an overlapping space between the first model and the second model with the second model, and filling the filling space of the first model with the second model; and a removing module, configured to remove the second model with which the removing space of the first model is filled, where when the overlapping space between the first model and the second model is filled with the second model, and the filling space of the first model is filled with the second model, the removing space of the first model is filled with the second model.

Optionally, the filling space of the first model is determined by receiving a user instruction.

Optionally, the first model includes a reference surface, and the first model is located on one side or both sides of the reference surface; after the first model is placed into the second model, rays are respectively made from one or more points on the reference surface to the second model along a placement direction, and one or more of the rays intersect a surface of the second model at one or more intersection points; and a first surface is determined by the one or more points on the reference surface, a second surface is determined by one or more intersection points where the one or more of the rays intersect the surface of the second model, and the filling space of the first model is determined by the first surface, the second surface, and the one or more of the rays.

Optionally, the one or more points on the reference surface include one or more points on a contour line of the reference surface.

Optionally, the removing space of the first model is determined by receiving a user instruction.

Optionally, the first model includes a reference surface, and the first model is located on one or both sides of the reference surface; and vertical line segments are respectively made from one or more points on the first model to the reference surface, and the removing space of the first model is determined by one or more of the vertical line segments and the reference surface.

Optionally, when the first model is located on one side of the reference surface, the one or more points on the first model include one or more points on the first model that are farthest from the reference surface; and when the first model is located on both sides of the reference surface, the one or more points on the first model include one or more points on the first model located on both sides of the reference surface that are farthest from the reference surface.

The present invention discloses a device for combining models in a virtual scene, the device includes a memory storing a computer-executable instruction and a processor, and the processor is configured to execute the instruction to implement the method for combining models in a virtual scene.

The present invention discloses a non-volatile computer storage medium coded with a computer program, the computer program includes an instruction, and the instruction is executed by more than one computer to implement the method for combining models in a virtual scene.

Compared with the prior art, main differences and effects of the embodiments of the present invention are as follows:

In the present invention, a first model is placed into a second model, a filling space and a removing space of the first model are determined, an overlapping space between the first model and the second model is filled with the second model, the filling space of the first model is filled with the second model, and the second model with which the removing space of the first model is filled is removed. In addition, the filling space and the removing space of the first model can be determined according to user instructions or by defining, so that when a scene designer combines the models, desired effects of the models can be automatically achieved, a workflow of the scene designer can be simplified, and repetitive work can be reduced.

DETAILED DESCRIPTION OF EMBODIMENTS

In the following description, many technical details are proposed for the reader to better understand this application.

However, persons of ordinary skill in the art can understand that even without these technical details and various changes and modifications based on the following embodiments, the technical solutions claimed by the claims of this application can be implemented.

In order to make the objectives, technical solutions, and advantages of the present invention clearer, the embodiments of the present invention are described in further detail below with reference to the accompanying drawings.

Figure 1:
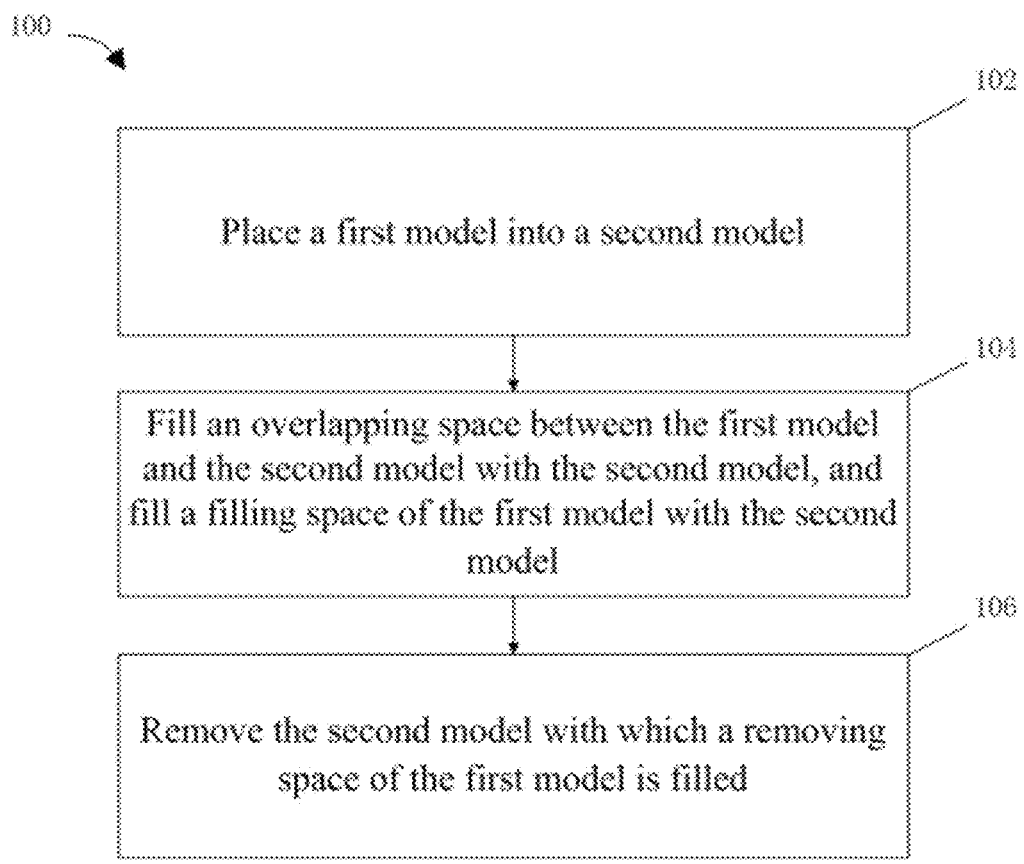
FIG. 1 is a schematic flowchart of a method for combining models in a virtual scene.

A first embodiment of the present invention relates to a method for combining models in a virtual scene. FIG. 1 is a schematic flowchart of a method for combining models in a virtual scene.

As shown in FIG. 1, the method 100 includes:

Step 102: Place a first model into a second model.

The first model and the second model may be 3D models.

A scene designer places the first model into the second model along a placement direction. The first model may be partially placed into the second model, or may be completely placed into the second model, or may not be in contact with the second model.

The first model may be placed into a desired position in the second model through step 102.

Step 104: Fill an overlapping space between the first model and the second model with the second model, and fill a filling space of the first model with the second model.

Also, after the first model is placed into the second model, only the overlapping space between the first model and the second model may be filled with the second model.

A desired space of the first model may be filled with the second model through step 104. It can be understood that the first model and the second model may not overlap, and the first model may not include the filling space.

Step 106: Remove the second model with which the removing space of the first model is filled. When the overlapping space between the first model and the second model is filled with the second model, and the filling space of the first model is filled with the second model, the removing space of the first model is filled with the second model.

An undesired space of the first model is prevented from being filled with the second model through step 106. It can be understood that the first model may not include the removing space.

Optionally, the filling space of the first model is determined by receiving a user instruction.

An instruction from a model maker and/or the scene designer may be received, and the filling space of the first model may be determined.

Before the first model is placed into the second model, a user instruction may be received, and the filling space of the first model may be determined.

Optionally, the first model includes a reference surface, and the first model is located on one side or both sides of the reference surface; after the first model is placed into the second model, rays are respectively made from one or more points on the reference surface to the second model along a placement direction, and one or more of the rays intersect a surface of the second model at one or more intersection points; and a first surface is determined by the one or more points on the reference surface, a second surface is determined by one or more intersection points where the one or more of the rays intersect the surface of the second model, and the filling space of the first model is determined by the first surface, the second surface, and the one or more of the rays.

The model maker makes the first model based on the reference surface, and for example, makes the first model upward and/or downward based on the reference surface.

The reference surface may be a regular shape or an irregular shape.

Optionally, the one or more points on the reference surface include one or more points on a contour line of the reference surface.

The contour line refers to an outer edge boundary of the reference surface.

The reference surface may intersect a surface of the second model.

The first surface may be bounded by the one or more points on the contour line of the reference surface and one or more intersection points where the reference surface intersects the surface of the second model, and the second surface may be bounded by one or more intersection points where the one or more of the rays intersect the surface of the second model, and the one or more intersection points where the reference surface intersects the surface of the second model, and the filling space of the first model may be bounded by the first surface, the second surface, and the one or more of the rays.

The reference surface may not intersect a surface of the second model.

The first surface can be bounded by the one or more points on the contour line of the reference surface, and the second surface can be bounded by one or more intersection points where the one or more of the rays intersect the surface of the second model. The filling space of the first model can be bounded by the first surface, the second surface, and the one or more of the rays.

Optionally, a removing space of the first model is determined by receiving a user instruction.

The instruction from the model maker and/or the scene designer may be received, and the removing space of the first model may be received.

Before the first model is placed into the second model, the user instruction may be received to determine the removing space of the first model.

Optionally, the first model includes a reference surface, and the first model is located on one side or both sides of the reference surface; and vertical line segments are respectively made from one or more points on the first model to the reference surface, and the removing space of the first model is determined by one or more of the vertical line segments and the reference surface.

The model maker makes the first model based on the reference surface, and for example, makes the first model upward and/or downward based on the reference surface.

The reference surface may be a regular shape or an irregular shape.

Optionally, when the first model is located on one side of the reference surface, the one or more points on the first model include one or more points on the first model that are farthest from the reference surface. When the first model is located on both sides of the reference surface, the one or more points on the first model include one or more points on the first model located on both sides of the reference surface that are farthest from the reference surface.

The one or more vertical line segments can be used as the height, and the reference surface can be used as the bottom surface and the top surface to determine one or more cubes as the removing space of the first model. Alternatively, the one or more vertical line segments can be used as the height, the reference surface can be used as the bottom surface, and the one or more points on the first model that are farthest from the reference surface can bound the top surface to determine one or more trapezoids as the removing space of the first model.

Before the first model is placed into the second model, the removing space of the first model may be determined according to the method described above.

It can be understood that the first model and the second model may be 2D models, where the filling space and the removing space of the first model can be a filling shape and a removing shape, and the reference surface can be a reference line, and the filling shape and the removing shape can be determined by using a method similar to the method described above.

Figure 2:
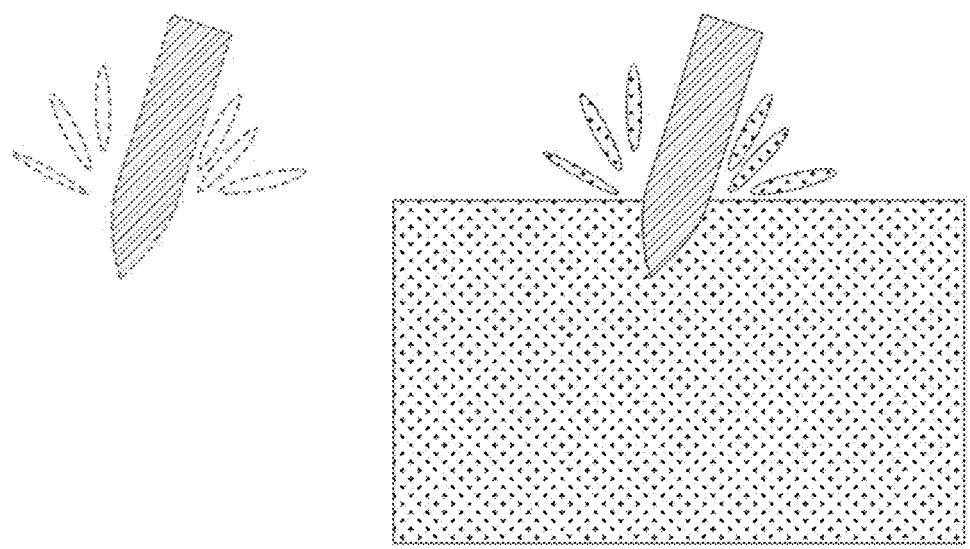
FIG. 2 is a cross-sectional view of a first example of a method for combining models in a virtual scene.

FIG. 2 is a cross-sectional view of a first example of a method for combining models in a virtual scene.

As shown in FIG. 2, a first model is a bullet and a second model is a wall. Firstly, the bullet is placed into the wall. Secondly, an instruction from a model maker and/or a scene designer is received, and it is determined that a filling space of the bullet is six fragments on both sides of a bullet body, and a removing space of the bullet is the bullet body. Thirdly, an overlapping space between the bullet and the wall is filled with the wall, and the six fragments are filled with the wall. Finally, the wall with which the bullet body of the bullet is filled is removed. Therefore, according to the method for combining models in the virtual scene, when the scene designer combines the bullet into the wall, a desired effect that the bullet is embedded in the wall and wall fragments are splashed can be achieved. It is understood that the filling space and the removing space of the bullet can be changed according to actual needs.

Figure 3:
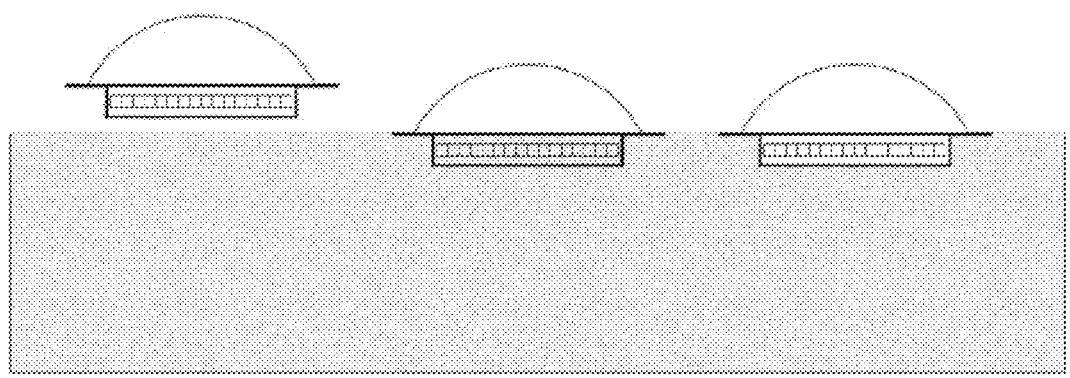
FIG. 3 is a cross-sectional view of a second example of a method for combining models in a virtual scene.

FIG. 3 is a cross-sectional view of a second example of a method for combining models in a virtual scene.

As shown in FIG. 3, a first model is a workstation, and a second model is a water body. First, the workstation is placed into the water body. Secondly, an instruction from a model maker and/or a scene designer is received, it is determined that the workstation does not include a filling space, and a removing space of the workstation is a workstation body. Thirdly, an overlapping space between the workstation and the water body is filled with the water body. Finally, the water body with which the workstation body of the workstation is filled is removed. Therefore, according to the method for combining models in the virtual scene, when the scene designer combines the workstation into the water body, a desired effect that an underwater part of the workstation is buried in the water body can be achieved. It can be understood that, according to actual needs, the removing space of the workstation can be changed, or the workstation can include a filling space.

Figure 4:
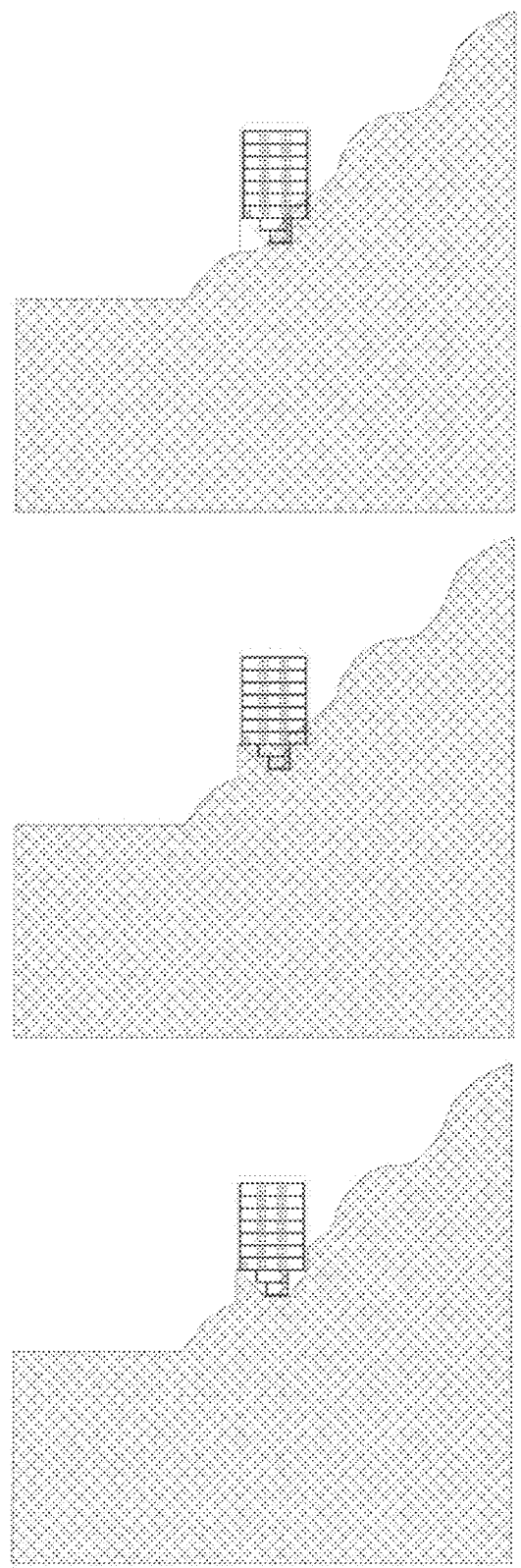
FIG. 4 is a cross-sectional view of a third example of a method for combining models in a virtual scene.

FIG. 4 is a cross-sectional view of a third example of a method for combining models in a virtual scene.

As shown in FIG. 4, a first model is a building, and a second model is a natural terrain. The building includes a reference surface, such as a foundation surface of the building. The building is located on both sides of the foundation surface. For example, the foundation surface divides the building into an above-ground part and an underground part.

Firstly, a removing space of the building is determined. Vertical line segments are respectively made from one or more points of the above ground part that are farthest from the foundation surface (for example, a roof of the building) to the foundation plane. The vertical line segments are used as the height, and the reference surface is used as the bottom and top surfaces, so that it is determined that a cube is used as a removing space of the first model, which is represented by the dashed-line box above the foundation surface. Vertical line segments are respectively made from one or more points of the underground part that are farthest from the foundation surface (for example, a second floor of the building) to the foundation surface. The vertical line segments are used as the height, the reference surface is used as the bottom surface, and one or more points on the first model that are farthest from the reference surface bound the top surface, so that it is determined that a trapezoid is also used as a removing space of the first model, which is represented by the dashed-line box below the foundation surface.

Secondly, the building is placed into the natural terrain. The foundation surface intersects a surface of the natural terrain, a part of the foundation surface sinks into the natural terrain, and another part of the foundation surface is suspended, and the foundation surface intersects the surface of the natural terrain at one or more intersection points.

Next, a filling space of the building is determined. Rays are respectively made from one or more points on a contour line of the foundation surface (for example, one or more points on a contour line of the suspended foundation surface) to the natural terrain along a placement direction, and one or more of the rays intersect the surface of the natural terrain at one or more intersection points. A first surface is bounded by the one or more points on the contour line of the foundation surface and the one or more intersection points where the foundation surface intersects the surface of the natural terrain, a second surface is bounded by the one or more intersection points where the one or more of the rays intersect the surface of the natural terrain and the one or more intersection points where the foundation surface intersects the surface of the natural terrain, and the filling space of the building is bounded by the first surface, the second surface, and the one or more of the rays, and is represented by the solid-line box below the foundation surface.

Still next, an overlapping space between the building and the natural terrain is filled with the natural terrain, and the filling space of the building is filled with the natural terrain.

Finally, the natural terrain with which the removing space of the building is filled is removed.

Therefore, according to the method for combining models in the virtual scene, when the scene designer combines the building into the natural terrain, a desired effect that the underground part of the building is buried in the natural terrain can be achieved.

It can be understood that the filling space and the removing space of the building can be changed according to actual needs. For example, the removing space of the building can be composed of two cubes above and below the foundation surface.

It can be understood that, similar to the third example, the filling space and the removing space of the first model in the first example and the second example can be determined, instead of being determined by the model maker and/or the scene designer.

Figure 5:
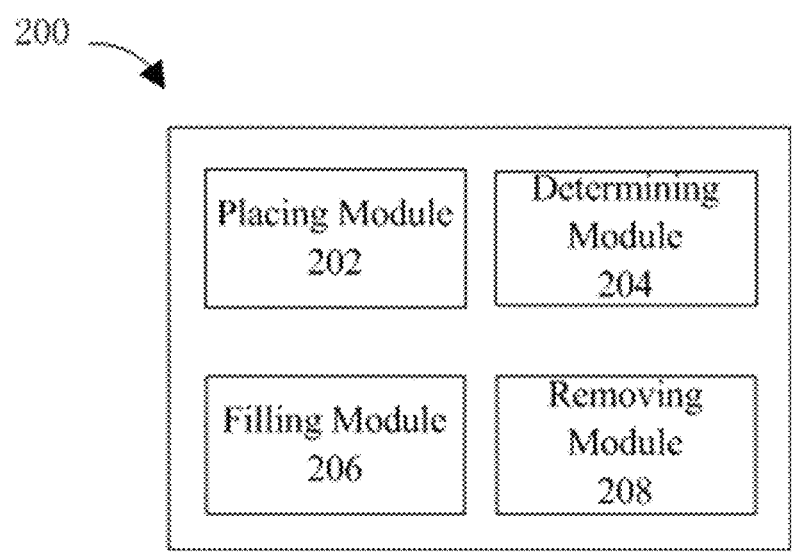
FIG. 5 is a schematic structural diagram of a system for combining models in a virtual scene.

A second embodiment of the present invention relates to a system for combining models in a virtual scene. FIG. 5 is a schematic structural diagram of a system for combining models in a virtual scene.

As shown in FIG. 5, a system 200 includes:
a placing module 202, configured to place a first model into a second model;
a determining module 204, configured to determine a filling space and a removing space of the first model;
a filling module 206, configured to fill an overlapping space between the first model and the second model with the second model, and filling the filling space of the first model with the second model; and
a removing module 208, configured to remove the second model with which the removing space of the first model is filled, where the overlapping space between the first model and the second model is filled with the second model, and the filling space of the first model is filled with the second model, the removing space of the first model is filled with the second model.

Optionally, the filling space of the first model is determined by receiving a user instruction.

Optionally, the first model includes a reference surface, and the first model is located on one side or both sides of the reference surface; after the first model is placed into the second model, rays are respectively made from one or more points on the reference surface to the second model along a placement direction, and one or more of the rays intersect a surface of the second model at one or more intersection points; and a first surface is determined by the one or more points on the reference surface, a second surface is determined by one or more intersection points where one or more of the rays intersect the surface of the second model, and the filling space of the first model is determined by the first surface, the second surface, and one or more of the rays.

Optionally, the one or more points on the reference surface include one or more points on a contour line of the reference surface.

Optionally, the removing space of the first model is determined by receiving a user instruction.

Optionally, the first model includes a reference surface, and the first model is located on one side or both sides of the reference surface; and vertical line segments are respectively made from one or more points on the first model to the reference surface, and the removing space of the first model is determined by one or more of the vertical line segments and the reference surface.

Optionally, when the first model is located on one side of the reference surface, the one or more points on the first model include one or more points on the first model that are farthest from the reference surface. When the first model is located on both sides of the reference surface, the one or more points on the first model include one or more points on the first model located on both sides of the reference surface that are farthest from the reference surface.

The first embodiment is a method embodiment corresponding to this embodiment, and this embodiment can be implemented in cooperation with the first embodiment. The related technical details mentioned in the first embodiment are still valid in this embodiment. In order to reduce repetition, details are not described herein. Correspondingly, the related technical details mentioned in this embodiment can also be applied in the first embodiment.

A third embodiment of the present invention relates to a device for combining models in a virtual scene. The device includes a memory storing computer-executable instructions and a processor. The processor is configured to execute the instructions to implement the method for combining models in a virtual scene.

The first embodiment is a method embodiment corresponding to this embodiment, and this embodiment can be implemented in cooperation with the first embodiment. The related technical details mentioned in the first embodiment are still valid in this embodiment. In order to reduce repetition, details are not described herein. Correspondingly, the related technical details mentioned in this embodiment can also be applied in the first embodiment.

A fourth embodiment of the present invention relates to a non-volatile computer storage medium encoded with a computer program. The computer program includes instructions that are executed by more than one computer to implement a method for combining models in a virtual scene.

The first embodiment is a method embodiment corresponding to this embodiment, and this embodiment can be implemented in cooperation with the first embodiment. The related technical details mentioned in the first embodiment are still valid in this embodiment. In order to reduce repetition, details are not described herein. Correspondingly, the related technical details mentioned in this embodiment can also be applied in the first embodiment.

It should be noted that each method implementation of the present invention can be implemented in software, hardware, firmware, and other ways. Regardless of whether the present invention is implemented in software, hardware, or firmware, instruction codes can be stored in any type of computer-accessible memory (for example, a permanent or modifiable, volatile or non-volatile, solid-state or non-solid, fixed or replaceable medium, etc.). Similarly, the memory may be, for example, programmable array logic (Programmable Array Logic, "PAL"), a random access memory (Random Access Memory, "RAM"), a programmable read-only memory (Programmable Read Only Memory, "PROM"), a read-only memory (Read-Only Memory, "ROM"), an electrically erasable programmable read-only memory (Electrically Erasable Programmable ROM, "EEPROM"), a magnetic disk, an optical disc, and a digital versatile disc (Digital Versatile Disc, "DVD").

It should be noted that the units/modules mentioned in the device embodiments of the present application are logical units/modules. Physically, a logical unit/module may be a physical unit/module or may be a part of a physical unit/module, or may be implemented as a combination of multiple physical units/modules. The physical implementation of these logical units/modules is not the most important. The combination of the functions implemented by these logical units/modules is the key to solving the technical problem presented in the present application. In addition, in order to highlight the innovation part of the present application, the above device embodiments of the present application do not introduce units that are not closely related to solving the technical problems raised by the present application, and this does not mean that there are no other units in the above device embodiments.

It should be noted that in the claims and the description of the patent, relational terms such as "first" and "second" are only used to distinguish one entity or operation from another entity or operation, and do not necessarily require or imply that there is any such actual relationship or order between these entities or operations. Moreover, the terms "comprise", "include" or any other variants thereof are intended to cover the non-exclusive inclusion, so that a process, method, product, or device that includes a list of elements not only includes those elements but also includes other elements that are not expressly listed, or further includes elements inherent to such a process, method, product, or device. An element defined by "includes a . . . " does not, without more constraints, preclude the existence of additional identical elements in the process, method, product, or device that includes the element.

Although the present application has been illustrated and described by referring to certain specific embodiments of the present application, persons of ordinary skill in the art should understand that various changes can be made in form and details without departing from the spirit and scope of the present application.

We claim:

1. A method for combining models in a virtual scene, wherein the method comprises:
   placing a first model into a second model;
   determining a filling space and a removing space of the first model;
   filling an overlapping space between the first model and the second model with the second model, and filling the filling space of the first model with the second model; and
   removing the second model with which the removing space of the first model is filled, wherein when the overlapping space between the first model and the second model is filled with the second model, and the filling space of the first model is filled with the second model, the removing space of the first model is filled with the second model,
   wherein the first model comprises a reference surface and the first model is located on one side or both sides of the reference surface;
   after the first model is placed into the second model, rays are extended, respectively, from one or more points on the reference surface to the second model in a placement direction, and one or more of the rays intersect a surface of the second model at one or more intersection points; and a first surface is determined by the one or more points on the reference surface,
   a second surface is determined by one or more intersection points where one or more of the rays intersect the surface of the second model, and
   the filling space of the first model is determined by the first surface, the second surface, and one or more of the rays.

2. The method according to claim 1, wherein the filling space of the first model is determined by receiving a user instruction.

3. The method according to claim 1, wherein the one or more points on the reference surface comprise one or more points on a contour line of the reference surface.

4. The method according to claim 1, wherein the removing space of the first model is determined by receiving a user instruction.

5. The method according to claim 1, wherein the first model comprises a reference surface, and the first model is located on one side or both sides of the reference surface, and vertical line segments are respectively made from one or more points on the first model to the reference surface, and the removing space of the first model is determined by one or more of the vertical line segments and the reference surface.

6. The method according to claim 5, wherein when the first model is located on one side of the reference surface, the one or more points on the first model comprise one or more points on the first model that are farthest from the reference surface; and when the first model is located on both sides of the reference surface, the one or more points on the first model comprise one or more points on the first model located on both sides of the reference surface that are farthest from the reference surface.

7. A device for combining models in a virtual scene, wherein the device comprises a memory storing a computer-executable instruction and a processor, and the processor is configured to execute the instruction to implement the method for combining models in a virtual scene according claim 1.

8. A non transitory computer storage medium coded with a computer program, wherein the computer program comprises an instruction, and the instruction is executed by more than one computer to implement the method for combining models in a virtual scene according to claim 1.

9. A system for combining models in a virtual scene, wherein the system comprises:
- one or more processors and a memory that stores instructions that, when executed by the one or more processors, cause the one or more processors to perform operations comprising:
- placing a first model into a second model;
- determining a filling space and a removing space of the first model;
- filling an overlapping space between the first model and the second model with the second model and filling the filling space of the first model with the second model; and
- removing the second model with which the removing space of the first model is filled,
- wherein when the overlapping space between the first model and the second model is filled with the second model, and the filling space of the first model is filled with the second model and the removing space of the first model is filled with the second model,
- where the first model comprises a reference surface, and the first model is located on one side or both sides of the reference surface;
- after the first model is placed into the second model, rays are extended, respectively, from one or more points on the reference surface to the second model in a placement direction, and one or more of the rays intersect a surface of the second model at one or more intersection points; and
- a first surface is determined by the one or more points on the reference surface,
- a second surface is determined by one or more intersection points where one or more of the rays intersect the surface of the second model, and
- the filling space of the first model is determined by the first surface, the second surface, and one or more of the rays.

* * * * *